United States Patent
Tufail et al.

(10) Patent No.: US 12,434,554 B2
(45) Date of Patent: Oct. 7, 2025

(54) HYDROGEN FUEL TANK MOUNTING SYSTEM

(71) Applicant: Ford Global Technologies, LLC, Dearborn, MI (US)

(72) Inventors: Khizer Tufail, London (GB); Guenter Grosch, Vettweiß (DE); Krystian Dylong, Cologne (DE); Rainer Kiehn, Frechen (DE); Klaus-Peter Heinig, Aachen (DE); Mauro Giroldo, Brentwood (GB); Bert Hobein, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 265 days.

(21) Appl. No.: 17/949,425

(22) Filed: Sep. 21, 2022

(65) Prior Publication Data
US 2023/0091244 A1    Mar. 23, 2023

(51) Int. Cl.
*B60K 15/03* (2006.01)
*B60K 15/07* (2006.01)

(52) U.S. Cl.
CPC ........ *B60K 15/03006* (2013.01); *B60K 15/07* (2013.01); *B60K 2015/03315* (2013.01)

(58) Field of Classification Search
CPC ............. B60K 15/07; B60K 15/03006; B60K 15/03315; B60K 15/04; B60K 15/067
USPC ....................................................... 280/834
See application file for complete search history.

(56) References Cited

U.S. PATENT DOCUMENTS

| | | | | |
|---|---|---|---|---|
| 6,676,163 B2 * | 1/2004 | Joitescu | ................. | B60K 15/07 280/834 |
| 2014/0015239 A1 * | 1/2014 | Schwark | .............. | B60K 15/067 280/834 |
| 2014/0137953 A1 | 5/2014 | Gibb et al. | | |
| 2020/0001706 A1 * | 1/2020 | Milton | .................... | F17C 1/005 |

FOREIGN PATENT DOCUMENTS

| | | |
|---|---|---|
| DE | 10 2012 011612 | 1/2013 |
| WO | WO 2020243611 | 12/2020 |
| WO | WO 2021126455 | 6/2021 |

OTHER PUBLICATIONS

EP Extended Search Report of EP Application No. 21198143.6 dated Mar. 15, 2022.

* cited by examiner

*Primary Examiner* — Hung Q Nguyen
(74) *Attorney, Agent, or Firm* — Haley Guiliano LLP

(57) ABSTRACT

A hydrogen fuel tank mounting system for a vehicle comprises a first mount for mounting a first portion of the fuel tank in a fixed position and a second mount for slidably mounting a second portion of the fuel tank. In this manner, the mounting system reduces stress on fuel system components when accommodating expansion and contraction of the hydrogen fuel tank, improving durability. The fuel tank may be a dual port fuel tank, and the first and second portions may be elongated neck portions. The fixed mount may be a bracket formed in two portions with a clearance between them. A sleeve may extend through at least part of the portions of the brackets to distribute shear forces away from an interface between those portions. The provision of a slidable mounting also allows pre-assembly of the fuel tank and mounts, facilitating installation of the hydrogen fuel system.

10 Claims, 4 Drawing Sheets

HYDROGEN FUEL TANK MOUNTING SYSTEM

CROSS-REFERENCE TO RELATED APPLICATIONS

The present application claims priority to European patent application number 21198143.6, filed on Sep. 21, 2021. The entire contents of the above listed application are hereby incorporated by reference for all purposes.

FIELD

The present disclosure concerns a system for mounting a hydrogen fuel tank in a vehicle, a hydrogen fuel system, and a vehicle that include such a mounting system, and a method of assembling such a hydrogen fuel system for attachment to a vehicle.

BACKGROUND

The use of hydrogen as a fuel for automobiles and other transportation vehicles is expected to increase in popularity in the near future. Onboard storage of hydrogen presents a number of challenges. Because of its low energy to volume ratio, hydrogen gas is often stored in a tank and kept at a high pressure, e.g., 5,000-10,000 psi (350-700 bar). These challenges may be particularly marked in the storage of hydrogen in light vehicles, such as automobiles, limiting the potential size and weight of the storage tank. In particular, a hydrogen storage tank may expand while being filled and contract while hydrogen is depleted through consumption.

SUMMARY OF INVENTION

According to a first aspect, there is provided a mounting system for a fuel tank, comprising a first mount configured to mount a first portion of the fuel tank in a fixed position on a vehicle, and a second mount configured to mount a second portion of the fuel tank on the vehicle to allow movement of at least part of the second portion of the fuel tank relative to the second mount. For example, the first mount may be configured to mount a first elongated neck portion of a dual port fuel tank, directly or indirectly, to a vehicle chassis, and the second mount may be configured to slidably mount a second elongated neck portion of the dual port fuel tank to the vehicle chassis.

Because the second mount allows movement of at least part of the second portion of the fuel tank, stresses on fuel pipes connected to the fuel tank, the first and second mounts, and other vehicle components may be reduced. This can, in turn, improve durability of the fuel system and vehicle and/or allow for reduced manufacturing tolerances.

The first mount may be a bracket comprising a body portion and a cap portion that, when attached together, form an aperture to receive the first portion of the fuel tank, connected together by at least one fastener. The fastener may be configured to attach the body portion to the cap portion with a clearance between the body portion and the cap portion. Such a clearance may reduce shear forces exerted on the first mount that would otherwise be experienced at an interface between the body portion and the cap portion, for example, in response to expansion or contraction of the fuel tank or shocks arising from sudden changes in motion of a vehicle.

A sleeve may be provided around at least part of the fastener to increase a region of the first mount over which such shear forces are distributed. For example, where the body portion and the cap portion of the first mount are attached together using one or more bolts, at least a part of a shaft of each bolt may be covered by a sleeve, e.g., a hollow dowel, that extends through at least a part of the body portion and at least a part of the cap portion.

The second mount may provide an aperture to receive the second portion of the fuel tank, configured to allow sliding motion of the at least part of the second portion of the fuel tank through the aperture. An insert may surround an inner surface of the aperture, formed of a material that provides surface along which the second portion can slide with reduced friction. The provision of a relative low friction surface improves the effectiveness with which the sliding motion and, therefore, the expansion and contraction of the fuel tank, is accommodated, as well as reducing wear on the second portion.

Where an insert is provided, the insert may include a circumferential groove configured to receive the inner surface of the aperture. By locating the inner surface of the aperture within such a groove, movement of the insert along a direction of the sliding motion, relative to the aperture, can be reduced or avoided altogether.

The second mount may be a bracket comprising a body portion and a cap portion that, when attached together, are arranged to receive the second portion of the fuel tank, and at least one fastener that attaches the body portion of the second mount to the cap portion of the second mount. For example, the body portion and the cap portion of the second mount may be attached to one another using one or more bolts. Such fasteners can assist in reducing forces arising from sudden changes in the motion of the vehicle, improving the durability of the mounting system, fuel system and vehicle.

According to another aspect, there is provided a hydrogen fuel system comprising a fuel tank configured to store gaseous fuel, and a mounting system according to the first aspect. In such a system, the fuel tank may be a dual port fuel tank with first and second elongated neck portions, where the first mount receives the first elongated neck portion and the second mount receives the second elongated neck portion.

According to yet another aspect, there is provided a vehicle including the above mounting system and/or hydrogen fuel system.

According to a further aspect, there is provided a method of assembling a fuel system, comprising attaching a first mount at a fixed position to a first portion of a fuel tank, attaching a second mount to a second portion of a fuel tank, wherein the second mount permits sliding motion of part of the second portion through the second mount, and attaching the first and second mounts, directly or indirectly, to a vehicle. In some examples, the method may comprise i) attaching a body portion of the first mount and a body portion of the second mount to the vehicle, ii) assembling an insert of the second mount to a second portion the fuel tank, iii) installing the fuel tank on the vehicle such that a first portion of the fuel tank engages the body portion of the first mount, and the insert is seated on the body portion of the second mount, iv) attaching a cap portion of the first mount to the body portion of the first mount to rigidly fix the first portion of the fuel tank to the vehicle, and v) attaching a cap portion of the second mount to the body portion of the second mount to slidably secure the second portion of the fuel tank to the vehicle.

Indeed, for the avoidance of doubt, the skilled person will appreciate that, except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

FIGURES

Examples will now be described by way of example only, with reference to the Figures, in which.

Figure 1:
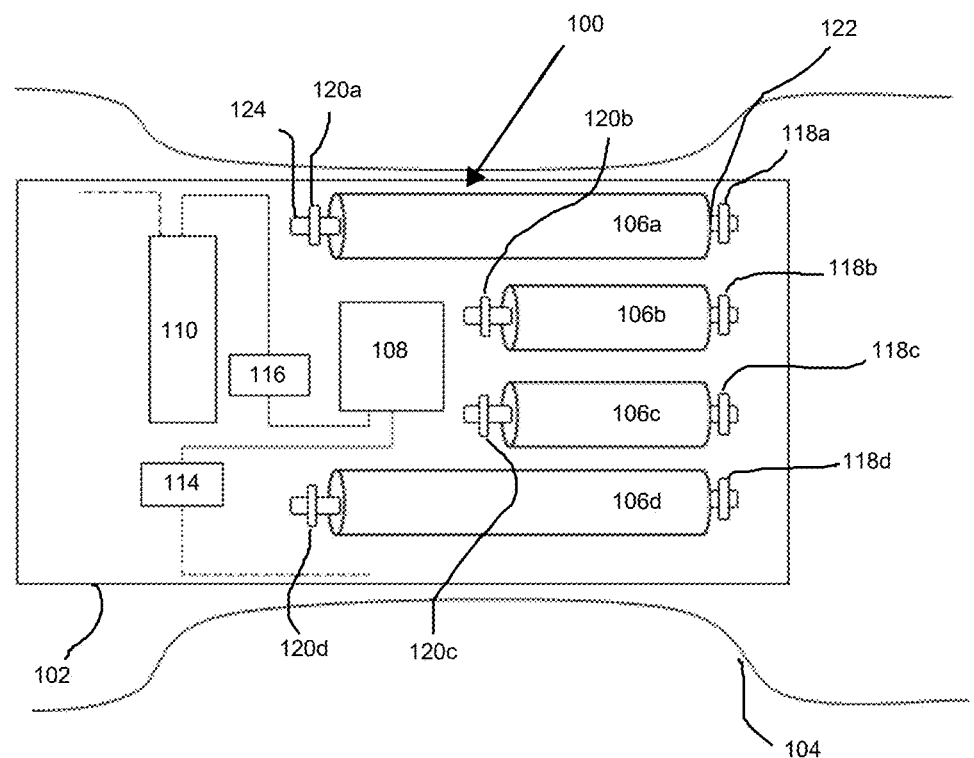
FIG. 1 depicts a fuel system according to an example, attached to a vehicle.
Figure 3:
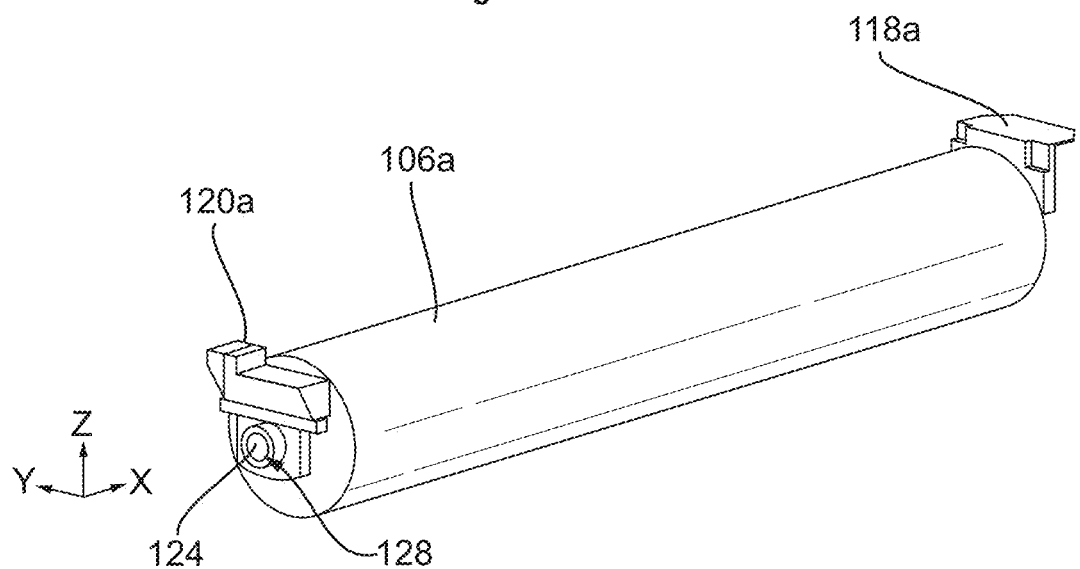
Figure 4:
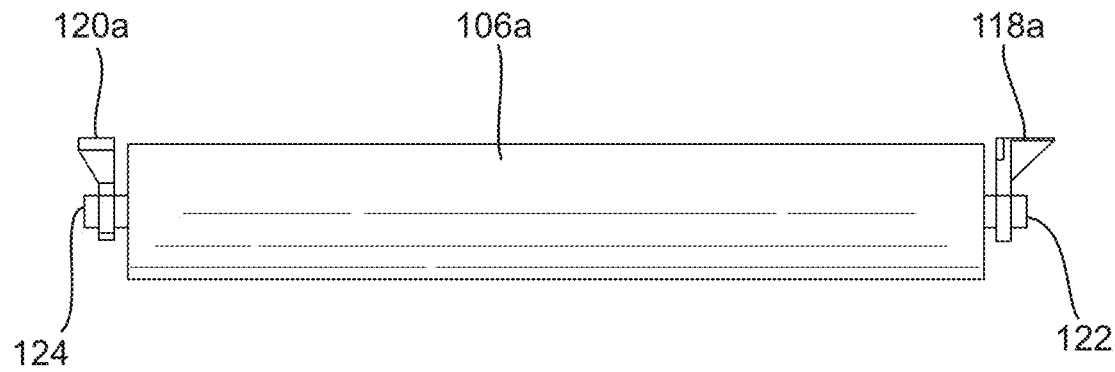
Figure 5:
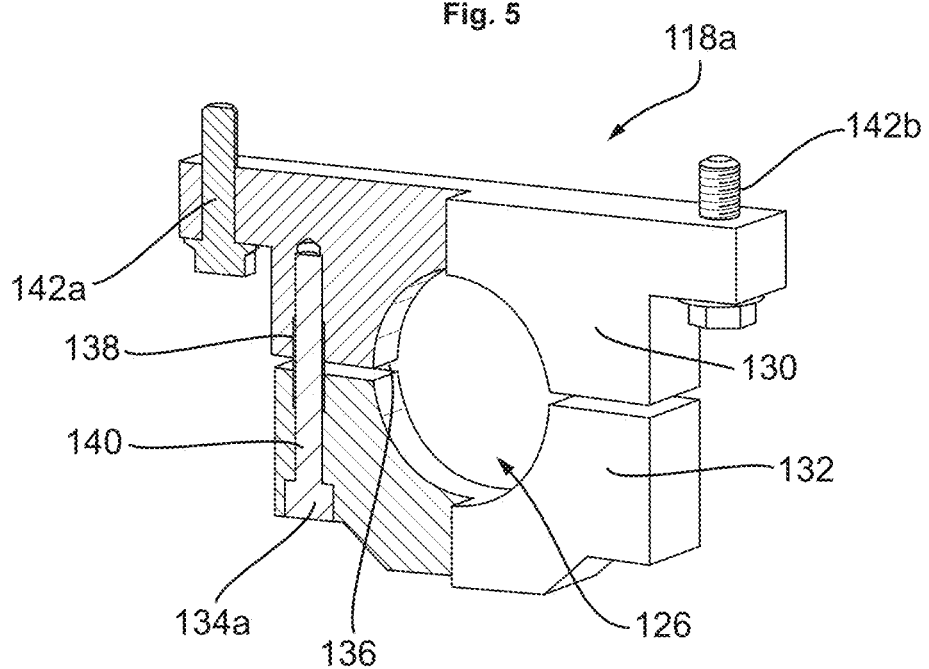
Figure 6:
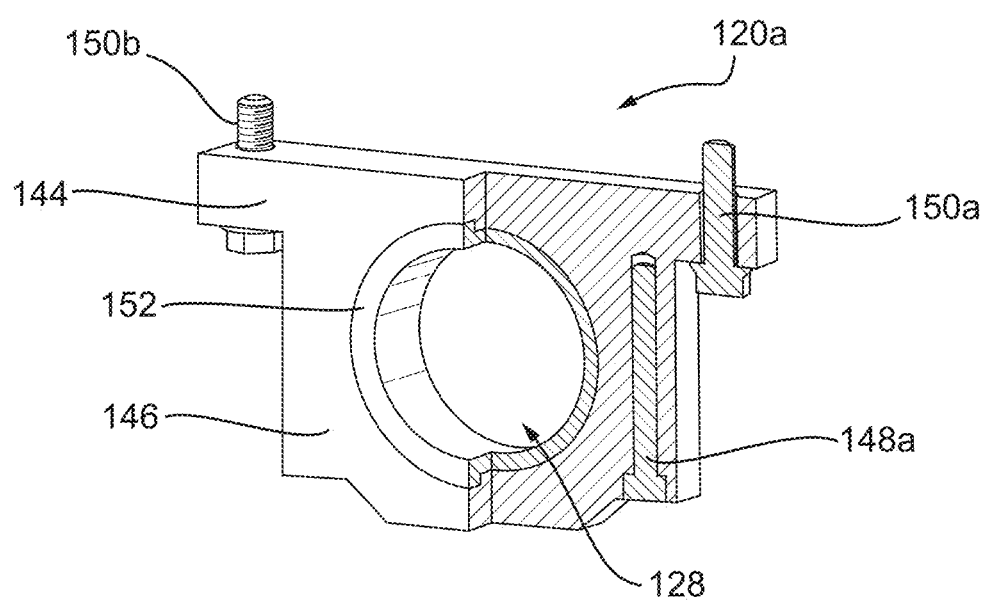
Figure 7:
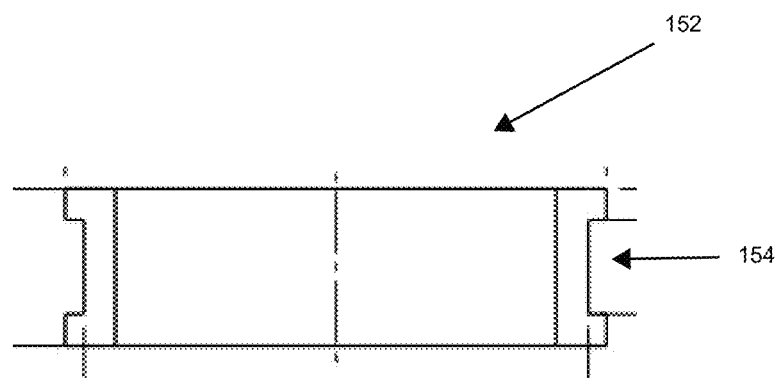

FIGS. 3 and 4 a fuel tank and first and second mounts in the fuel system of FIG. 1;

FIG. 5 depicts a first mount in the fuel system of FIG. 1;

FIG. 6 depicts a second mount in the fuel system of FIG. 1;

FIG. 7 depicts an insert for use in the second mount of FIG. 6; and

Figure 8:
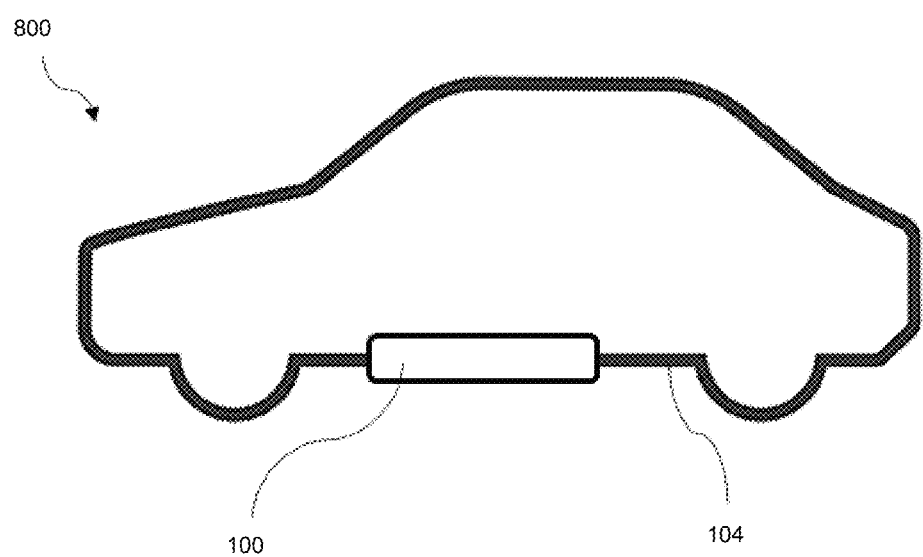

FIG. 8 depicts a vehicle in which the fuel system of FIG. 1 is mounted.

DETAILED DESCRIPTION

Figure 2:
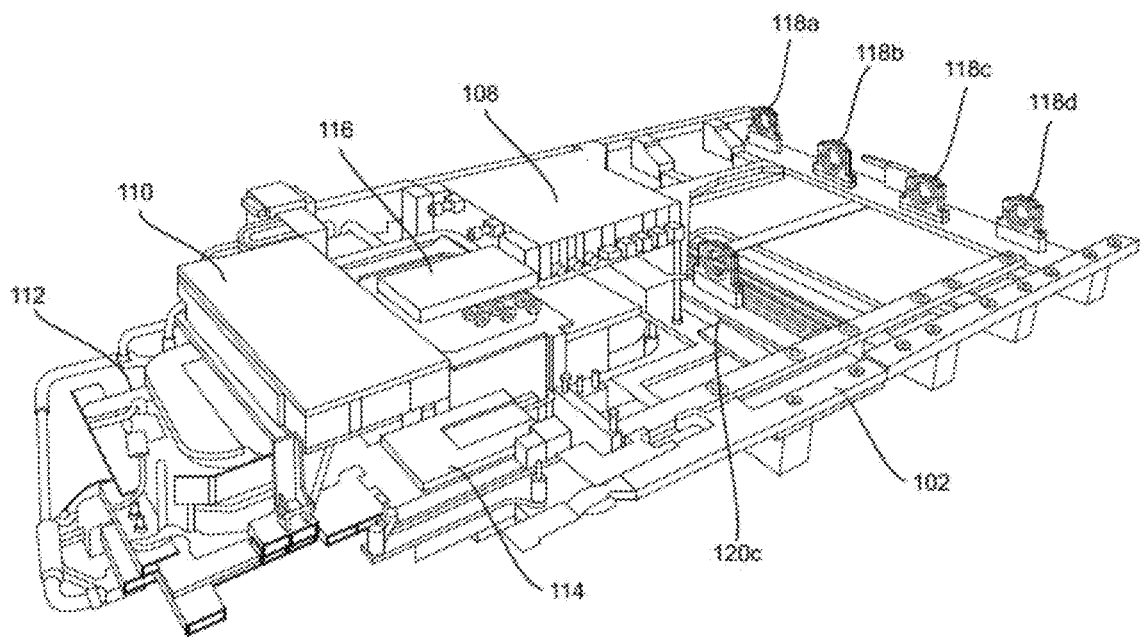
FIG. 2 depicts part of the fuel system of FIG. 1.

With reference to FIGS. 1 and 2, a fuel system 100 is mounted in a cradle 102 and attached to a vehicle chassis 104. In this particular example, the fuel system 100 includes four hydrogen fuel tanks 106a-d arranged to supply hydrogen gas to a fuel cell 108. The fuel system 100 also includes batteries 110, 112, inverter 114, distribution unit 116.

The fuel tanks 106a-d are attached to the cradle 102 by respective first and second mounts. For example, fuel tank 106a is attached by first mount 118a and second mount 120a. FIG. 2 is a view of the cradle 102 with the fuel tanks 106a-106d removed, allowing the first mounts 118a-d for respective fuel tanks 106a-d and the second mount 120c for fuel tank 106c to be shown more clearly.

FIGS. 3 and 4 depict one of the fuel tanks 106a of the fuel system 100. In this example, the fuel tank 106a is a dual port fuel tank including first and second elongated neck portions 122, 124. The first elongated neck portion 122 is attached to the chassis 104 via the cradle 102 and the first mount 118a, while the second elongated neck portion 124 is attached to the chassis 104 via the cradle 102 and the second mount 120a.

The first and second mounts 118a, 120a each include an aperture 126, 128 configured to receive respective ones of the neck portions 122, 124 of the fuel tank 106a. The first mount 118a is configured to hold the first elongated neck portion 122 in a fixed position, while the second mount 120a is configured to allow sliding motion of the second elongated neck portion 124 through the aperture 128, along the x direction indicated in FIG. 3.

As discussed above, the hydrogen fuel tank 106a may expand while being filled. An expansion of the fuel tank 106a will cause sliding motion of the second neck portion 124 through the aperture 128 of the second mount 120a along the negative x direction, while the first neck portion 122 remains fixed in position by the first mount 118a. Such sliding motion of part of the fuel tank 106a allows the expansion of the fuel tank 106a to be accommodated within the fuel system 100 with reduced stress on the components of the fuel system 100, when compared with systems using only fixed mountings.

In a similar manner, contraction of the fuel tank 106a as the amount of hydrogen stored in the fuel tank 106a decreases causes sliding motion of the second neck portion 124 through the aperture 128 in the positive x direction, allowing the contraction to be accommodated with limited stress on the components of the fuel system 100.

FIG. 5 depicts an example first mount 118a for use in the fuel system 100 of FIG. 1, where a portion of the first mount 118a on the left of FIG. 5 is shown in section. In this particular example, the first mount 118a includes a body portion 130 and a cap portion 132, which form the aperture 126 when attached together by at least one fastener. In the example shown in FIG. 5, the body portion 130 and cap portion 132 are attached together by one or more bolts 134a that extend through at least part of the body portion 130 and at least part of the cap portion 132.

The fastener may be configured to provide a clearance 136 between adjacent surfaces of the body portion 130 and cap portion 132 when attached together. Such a clearance may reduce the effect of shear forces that would be present at the interface between the body portion 130 and cap portion 132 if their adjacent surfaces were in contact, or close contact, e.g., when clamping one end of the fuel tank to the vehicle.

Optionally, a sleeve 138 is provided around each fastener and extends into at least a part of the body portion 130 and at least a part of the cap portion 132. In this particular example, a sleeve 138, such as a hollow dowel, is provided around a part of a shaft 140 of each bolt 134a. Such a sleeve 138 can distribute any shear forces experienced by the bolt 134a along its shaft 140, e.g., due to loading of the cap portion 132 relative to the body portion 130.

In this manner, the clearance 136 and the sleeve 138 can limit localisation of stresses on at least one of the fastener, the body portion 130 and cap portion 132, improving the durability of the first mount 118a.

As shown in FIG. 5, the first mount 118a may be attached to the cradle 102 using bolts 142a, 142b or other fasteners. In other examples, the first mount 118a may be attached directly to the chassis 104 and/or to another part of a vehicle.

FIG. 6 depicts an example second mount 120a for use in the fuel system 100 of FIG. 1, where a portion of the second mount 120a on the right of FIG. 6 is shown in section. In this example, the second mount 120a includes a body portion 144 and a cap portion 146, which form the aperture 128 when attached together. In the example shown in FIG. 6, the body portion 144 and cap portion 146 are attached together by at least one fastener. In this particular example, the at least one fastener includes a bolt 148a that extends through at least part of the body portion 144 and at least part of the cap portion 146 of the second mount 120a, to clamp the body portion 144 and the cap portion 146 together.

The second mount 120a may be attached to the cradle 102, the chassis 104, or another part of a vehicle, using fasteners such as bolts 150a, 150b.

Optionally, the insert 152 is provided that surrounds an inner surface of the aperture 128. The insert 152 may be formed of a material that reduces friction when the second neck portion 124 of the fuel tank 106a slides through the aperture 128. In this particular example, the insert 152 is formed of a plastics material.

As shown in FIGS. 6 and 7, the insert 152 may include a circumferential groove 154, configured to receive the inner surface of the aperture 128. Because the inner surface of the aperture 128 is located within the groove 154, contact between the inner surfaces of the groove 154 and sides of the body portion 144 and the cap portion 146 resists motion of the insert 152 along the x direction. In this manner, the insert 152 is held in position when the second neck portion 124 is sliding through the aperture 128. The body portion 144 and the cap portion may be sized to ensure that tightening of a fastener, e.g., bolt 148a, does not substantially deform, e.g., by more than 10 microns or 100 microns, an inner opening of the insert 152 upon clamping the body portion 144 and the cap portion 146 together. In this manner, excessive clamping force is not applied to a portion of the fuel tank that is secured in the second mount 120a.

FIG. 8 shows an example of a vehicle 800 in which the fuel system may be installed. The vehicle 800 includes the fuel system 100 described above with reference to FIG. 1, located in the cradle 102 and attached to the underside of the chassis 104. As discussed above, in other examples, the fuel system 100 may be attached, directly or indirectly, to the chassis 104 or to another part of the vehicle.

Although the vehicle 800 shown in FIG. 8 is an automobile, the mounting system described above may be used to mount fuel tanks in other vehicles, including vans, trucks, coaches, buses, trucks, lorries, or any other appropriate vehicle. In some examples the mounting system described above may be used to mount fuel tanks in other applications, such as power generators, etc.

It will be understood that the invention is not limited to the examples described above and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A mounting system for a fuel tank, comprising:
a first mount configured to attach a first portion of the fuel tank in a fixed position on a vehicle, wherein the first mount is a bracket comprising:
 a first body portion and a first cap portion that, when attached together, form a first aperture to receive the first portion of the fuel tank;
 at least one first fastener attaching the first body portion to the first cap portion and rigidly fixing the first portion of the fuel tank in the fixed position; and
 a sleeve surrounding at least part of a shaft of the at least one first fastener; and
wherein, when the first body portion is attached to the first cap portion, adjacent surfaces of the first body portion and the first cap portion are separated by a clearance, and the sleeve extends into a part of the first body portion, across the clearance and into a part of the first cap portion, the sleeve distributing shear forces experienced by the at least one first fastener along its shaft due to loading of the first cap portion relative to the first body portion; and
a second mount configured to attach a second portion of the fuel tank on the vehicle and to allow movement of at least part of the second portion relative to the vehicle, wherein the second mount is a bracket comprising:
 a second body portion and a second cap portion that, when attached together, form a second aperture to receive the second portion of the fuel tank and allow sliding of the second portion through the second aperture;
 at least one second fastener attaching the second body portion to the second cap portion; and
 an insert surrounding an inner surface of the second aperture, wherein the insert includes a circumferential groove configured to receive the inner surface of the second aperture; and
 wherein the second body portion and the second cap portion are sized to ensure that tightening of the second at least one fastener does not substantially deform an inner opening of the insert upon clamping the second body portion and the second cap portion together.

2. The mounting system of claim 1, wherein the second mount is a bracket comprising:
a body portion and a cap portion that, when attached together, are arranged to receive the second portion of the fuel tank; and
at least one fastener that attaches the body portion of the second mount to the cap portion of the second mount.

3. A fuel system comprising:
a dual port fuel tank configured to store gaseous fuel; and
the mounting system of claim 1;
wherein:
 the first portion is a first elongated neck portion of the fuel tank; and
 the second portion is a second elongated neck portion of the fuel tank.

4. A vehicle comprising a fuel system according to claim 3.

5. A method of assembling a fuel system, comprising:
attaching a first mount at a fixed position to a first elongated neck portion of a dual port fuel tank, wherein the first mount is a bracket comprising:
 a first body portion and a first cap portion that, when attached together, form a first aperture to receive the first portion of the fuel tank;
 at least one first fastener attaching the first body portion to the first cap portion and rigidly fixing the first portion of the fuel tank in the fixed position; and
 a sleeve surrounding at least part of a shaft of the at least one first fastener; and
wherein, when the first body portion is attached to the first cap portion, adjacent surfaces of the first body portion and the first cap portion are separated by a clearance, and the sleeve extends into a part of the first body portion, across the clearance and into a part of the first cap portion, the sleeve distributing shear forces experienced by the at least one first fastener along its shaft due to loading of the first cap portion relative to the first body portion;
attaching a second mount to a second elongated neck portion of the dual port fuel tank, wherein the second mount permits sliding motion of part of the second elongated neck portion through the second mount, wherein the second mount is a bracket comprising:
 a second body portion and a second cap portion that, when attached together, form a second aperture to receive a second portion of the fuel tank and allow sliding of the second portion through the second aperture;
 at least one second fastener attaching the second body portion to the second cap portion; and
 an insert surrounding an inner surface of the second aperture, wherein the insert includes a circumferential groove configured to receive the inner surface of the second aperture; and
 wherein the second body portion and the second cap portion are sized to ensure that tightening of the second at least one fastener does not substantially deform an inner opening of the insert upon clamping the second body portion and the second cap portion together; and
attaching the first and second mounts to a vehicle.

6. The method of claim 5, wherein the first mount is a bracket comprising:

a body portion and a cap portion that, when attached together, form an aperture to receive the first portion of the fuel tank;

at least one fastener attaching the body portion to the cap portion; and the sleeve surrounding at least part of the at least one fastener and extending through at least part of the body portion and at least part of the cap portion.

7. The method of claim 6, wherein, when the body portion is attached to the cap portion, adjacent surfaces of the body portion and the cap portion are separated by a clearance.

8. The method of claim 5, wherein the second mount includes:

an aperture configured to receive the second portion of the fuel tank and allow sliding of the second portion through the aperture.

9. The method of claim 8, comprising:

attaching an insert to an inner surface of the aperture such that the insert surrounds the inner surface of the aperture; and forming a circumferential groove on the insert configured to receive the inner surface of the aperture.

10. The method of claim 5, wherein the second mount is a bracket comprising:

a body portion and a cap portion that, when attached together, are arranged to receive the second portion of the fuel tank; and at least one fastener that attaches the body portion of the second mount to the cap portion of the second mount.

* * * * *